United States Patent
Klancnik

[11] 3,774,897
[45] Nov. 27, 1973

[54] WORK PIECE FIXTURES
[76] Inventor: Adolph V. Klancnik, 1020 Glenview Rd., Glenview, Ill.
[22] Filed: May 12, 1972
[21] Appl. No.: 252,553

[52] U.S. Cl. ................................. 269/34, 269/234
[51] Int. Cl. ............................................. B23q 3/08
[58] Field of Search .................. 269/34, 218, 229, 269/234, 24, 25, 30, 32, 230, 232, 196, 198, 199

[56] References Cited
UNITED STATES PATENTS

| | | | |
|---|---|---|---|
| 2,850,926 | 9/1958 | Jobe | 269/34 X |
| 1,350,206 | 8/1920 | Barnes | 269/34 X |
| 2,656,820 | 11/1953 | Becker | 269/25 X |
| 2,364,239 | 12/1944 | Parks | 269/34 |
| 555,125 | 2/1896 | Roberts | 269/234 X |
| 1,936,263 | 11/1933 | Pope | 269/234 X |
| 3,170,322 | 2/1965 | Cavanaugh | 269/234 X |
| 3,630,391 | 12/1971 | Wilson | 269/32 X |

Primary Examiner—Othell M. Simpson
Assistant Examiner—Joseph T. Zatarga
Attorney—James B. Kinzer et al.

[57] ABSTRACT

A work piece holding fixture is characterized by a pair of arms presenting work piece holding jaws at one end and rollers at the opposite end, the latter accepting a tapered rod disposed normal thereto for actuating the arms.

1 Claim, 4 Drawing Figures

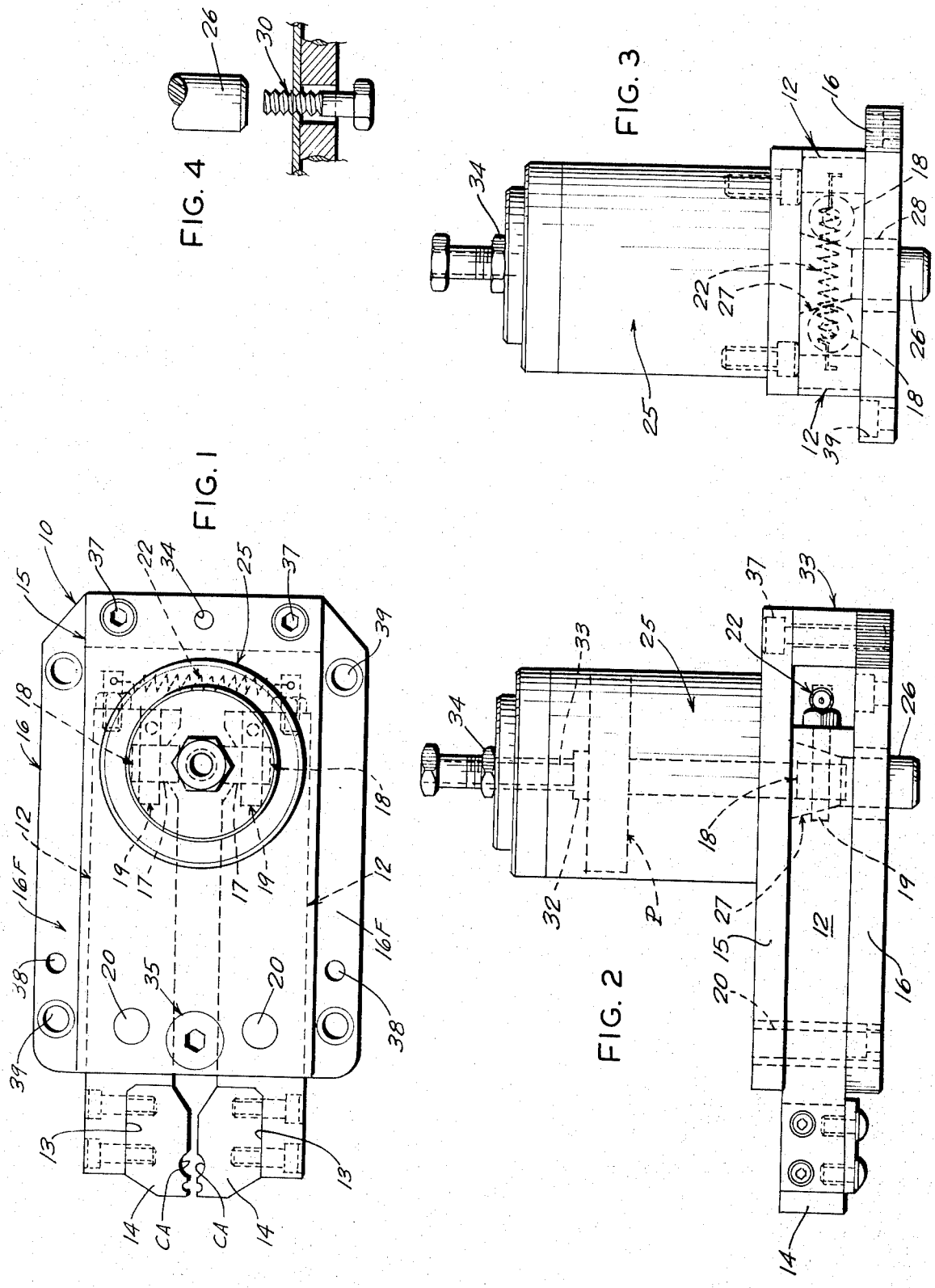

WORK PIECE FIXTURES

This invention relates to a fixture to be associated with a machine tool for the purpose of holding or presenting a work piece to a tool.

A work piece fixture of known form comprises two pivoted arms which at one end have jaw elements for gripping the work piece. A slide having a fixed path of movement is located between the arms. The slide carries a pair of rollers engageable with spaced wedge faces on arms defining a throat convergent away from the rollers, the arrangement being such that by moving the slide to cause the rollers to travel on the wedge faces, the arms are actuated to grip the work piece. It is found, however, that the wedge faces do not wear evenly and consequently the gripping action on the work piece is not uniform. An object of the present invention is to utilize a wedge and roller principle to actuate a pair of work piece gripping jaws, but to do so while substantially reducing, if not altogether eliminating, the wear problem.

In the known arrangement, as noted, the rollers are on a slide and the arms present a wedge-shaped throat, requiring the slide to travel parallel to the long axes of the arms. This requires a great deal of spread between the arms, sufficient to accommodate the slide-mounted rollers, severely limiting utility of the fixture. It will be appreciated that any practical construction requires sturdy rollers and a sturdy slide as well. Another object of the present invention is to drastically alter the known arrangement: the rollers are mounted on the arms, and a tapered or wedge-shaped rod is disposed between the rollers, so that by extending the rod the arms are actuated to grip a work piece. By using a round rod, frusto-conical, the first object mentioned, to reduce wear, can be achieved at the same time inasmuch as contact between the rod and rollers is point-to-point.

Other objects of the present invention are to construct the fixture from a pair of parallel plates which sandwich the work piece gripping arms therebetween whereby the fixture may be inexpensively manufactured, whereby the fixture may be easily attached to a machine tool, and which also allows a fluid operated piston to be advantageously used for reciprocating an actuator rod.

Other and further objects of the present invention will be apparent from the following description and claims and are illustrated in the accompanying drawings which, by way of illustration, show a preferred embodiment of the present invention and the principle thereof and what is now considered to be the best mode contemplated for applying that principle. Other embodiments of the invention embodying the same or equivalent principles may be used and structural changes may be made as desired by those skilled in the art without departing from the present invention.

In the drawing:

FIG. 1 is a top plan view of a fixture constructed in accordance with the present invention;

FIG. 2 is a side elevation of the fixture shown in FIG. 1; and

FIG. 3 is an end elevation of the fixture shown in FIG. 1; and

FIG. 4 is a fragmentary detail view showing the relation between a stop and a rod of the fixture.

The fixture 10 of the present invention is one for presenting a work piece to a tool, and to this end comprises a pair of pivotally mounted arms 12 each of which at one end terminates in an L-shaped recess 13 in which is detachably secured a jaw element 14. Each jaw element is formed with a cavity CA, one opposed to the other, and collectively representing the contour of the work piece to be disposed therebetween. The work pieces may be automatically fed or hand fed to the open jaw recesses whereafter the arms 12, FIG. 1, are so pivoted as to contract the jaws to grip the work piece. The working tool (not shown) is then advanced to engage the work piece to drill, tap, countersink or otherwise shape the work piece as planned.

The jaw supporting arms 12 are disposed between upper and lower support plates 15 and 16, respectively, as will be described in more detail below. The arms 12 at the ends opposite the jaws 14 are formed with mounting recesses 17 in which rollers 18 are rotatably mounted on pins 19. It will be recognized that the axes of the rollers 18 are parallel to the long axes of the arms 12. The arms intermediate the ends are pivoted on respective pins 20. A coil spring 22 under light tension is in effect anchored to the inner ends of the arms 12, as shown in FIG. 1, to bias the jaws 14 to the open position.

An air cylinder 25 is secured to the upper face of the upper housing plate 15. A piston P within the cylinder has a rod 26 attached thereto in alignment with the throat between the rollers 18. In fact, the piston rod 26 between the ends thereof has an enlarged frusto-conical portion 27 disposed between the rollers 18, as shown in FIGS. 2 and 3. Inasmuch as the cone shaped portion 27 is round and since the rollers by definition are round there is minimal tangential contact between the piston rod and the rollers, with little wear.

The piston rod 26, FIGS. 2 and 3, is normally retracted to present the narrow end of the tapered portion 27 to the rollers 18. However, by admitting air under pressure to the cylinder 25 the piston therein is extended to present the wider part of the tapered rod to the rollers 18 whereby the arms 12, FIG. 1, are actuated to contract the jaws 14, characterizing work piece gripping movement. On the other hand, by retracting the piston rod 26 to present the narrow portion to the rollers 18, the spring 22 is allowed to restore the arms 12 to the normal jaw-open position, shown in FIG. 1.

It will be noted that the piston rod extends through an opening 28, FIG. 3, in the lower housing plate 16. This is so in order that the free or extended end of the piston rod 26 may be related to an adjustable stop 30 on the adjacent machine tool equipment. This is shown in FIG. 4 wherein the piston rod 26 is aligned with the adjustable stop pin 30 so that by locating the free end of the stop 30 the effective advancing stroke of the piston may be predetermined, and therefore the closing pressure of the jaws 14 on the work piece.

Likewise, FIG. 2, the piston P on the return stroke is engageable with a stop 32 presented at the lower end of a screw 33 which extends outward of the cylinder 25, the extended portion being adjustable by way of an adjusting nut 34 thereby to locate the stop 32 within the cylinder 25 to predetermine the span of the jaws 15 in their open position.

A rear spacer 33 of appropriate thickness is located between the plates 15 and 16, assembly being facilitated by a dowel pin 34 which fits in and registers with aligned openings in the rear spacer 33 and the top and bottom plates.

A front spacer 35 is interposed between the top and bottom plates. Assembly and orientation is attained through the dowel pins 20 which also constitute the pivots for the arms 12. The housing structure or sandwich thus attained is tightly secured by socket head cap screws 37 extending from the top plate through the rear spacer into tapped openings in the bottom plate. It will be seen that the arms 12 pivot on the dowel pins 20 which serve the additional purpose of locating and orienting the parts during assembly.

The bottom plate 16 is preferably of greater width compared to the top plate 15. Accordingly the bottom plate has side flanges 16F provided with apertures 38 enabling dowel pins to be used in securing the bottom plate to a machine tool.

Openings as 39 at the four corners of the bottom plate are adapted to receive the heads of screws for attaching the fixture to the machine tool.

It will be seen from the foregoing that a neat, compact fixture is attained in which minimal contact occurs between the actuating rod 26 and the rollers 18. Wear is at a minimum especially if hardened alloy parts are used. The stroke of the actuating rod 26 is at right angles to the length of the arms 12. This permits a compact housing 15–16 and also allows conveniently located stops 30 and 32 to be associated with the piston, thereby to enable the open and closed positions of the jaws 14 to be accurately determined.

I claim:

1. A fixture for holding and presenting a work piece to a tool and comprising a pair of pivotally mounted elongated arms, said arms at one end each having a jaw element for closing on and engaging the work piece, said arms being disposed between a pair of opposed upper and lower plates, said arms having rollers thereon adjacent the opposite ends thereof, means biasing the jaw elements to an open position to enable the work piece to be located therebetween, a tapered rod having the axis thereof disposed normal to the axes of said arms and at right angles to the length of said arms, said rod having the narrow part thereof aligned with the space between the rollers in contact with the rollers, a fluid-operated piston for actuating the rod to dispose the wider portion of the rod in the space between rollers causing the jaws to close, said piston being located within a cylinder secured to one of said plates, said rod passing between the rollers and extending outward of the opposite one of said plates to engage a stop for limiting the stroke of the piston in one direction, and said cylinder having a stop limiting the stroke of the piston in the other direction.

* * * * *